WILLIAM SHOCKLEY
INVENTOR.
BY Flehr and Swain
ATTORNEYS

May 17, 1960 W. SHOCKLEY 2,937,114

SEMICONDUCTIVE DEVICE AND METHOD

Filed May 29, 1959 2 Sheets-Sheet 2

WILLIAM SHOCKLEY
INVENTOR.

BY Flehr and Swain

ATTORNEYS

United States Patent Office 2,937,114

Patented May 17, 1960

2,937,114

SEMICONDUCTIVE DEVICE AND METHOD

William Shockley, Los Altos, Calif., assignor to Shockley Transistor Corporation, Palo Alto, Calif., a corporation of California Application May 29, 1959, Serial No. 817,705

10 Claims. (Cl. 148—33)

This invention relates to a semiconductive device and method of forming the same.

In many applications, it is desirable to have active extremely small semiconductive structures which are contained within larger bodies of relatively inactive semiconductive material. For example the active region may be so small that it is extremely difficult to handle unless one is able to sustain the same in a larger block of semiconductive material.

It is a general object of the present invention to provide a semiconductive device which has an extremely small active region and method of forming the same.

It is another object of the present invention to provide a semiconductive device which includes a small active region supported within a larger body of relatively inactive semiconductive material.

It is a further object of the present invention to provide a semiconductive device with a structure which has localized high concentration gradients along a single dislocation.

It is still another object of the present invention to provide a semiconductive device and method in which relatively high concentration regions are formed along a single dislocation contained in the device.

These and other objects of the invention will become more clearly apparent from the following description when taken in conjunction with the accompanying drawing.

Referring to the drawing:

Figure 1 is a perspective view showing a slice of semiconductive material including a single dislocation;

Figures 2A–D show the steps in forming a diode in accordance with the invention;

Figures 3A–D show the steps in forming a transistor in accordance with the invention;

Figures 4A–C show another method of forming a diode in accordance with the invention;

Figure 1:
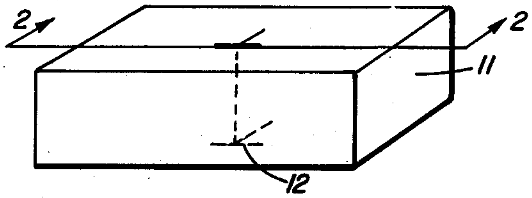

Figure 1 shows a body of semiconductive material 11 which includes a single dislocation 12. Such a body can be cut from a slice taken from a crystal grown with a small number of dislocations. Crystals, including small numbers of dislocations may be grown by well known techniques, see, for example, "Silicon Crystals Free of Dislocation," Journal of Applied Physics, vol. 29, page 736, 1958. In this article it is pointed out that the number of dislocations which are present depends upon the number in the original seed from which the crystal is grown. By carefully selecting seeds, it is possible to grow crystals of small diameters containing only one or two dislocations. These crystals forming bodies are of the type shown in Figure 1. The actual dimensions of the body shown in Figure 1 may be relatively small, as small as prior art semiconductive structures.

In order to form a body 11 containing a dislocation, it is necessary to identify the dislocations in a slice cut from the original crystal. Dislocations may be identified in a variety of ways. For example, the slice of material may be etched so as to cause the dislocations to appear by techniques well known in the art. A good method of developing etch pits in silicon has been described in the Journal of Applied Physics, vol. 27, page 1193, 1956. Dislocations may also be identified without subjecting the slice to etching by using X-ray techniques. Techniques of this type are described in the Journal of Applied Physics, March 1958, vol. 29, page 597.

Figure 2A:
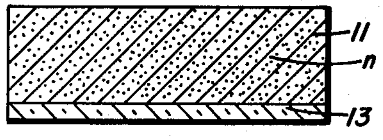
Figure 2B:
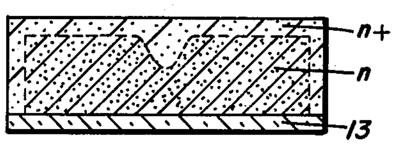
Figure 2C:
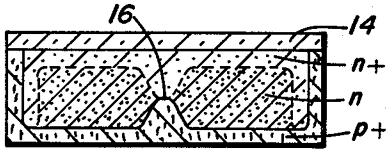
Figure 2D:
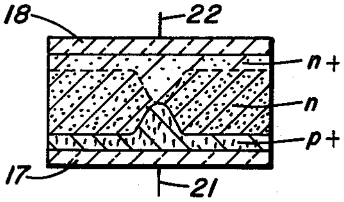

Referring to Figures 2A–D, the lower surface of a body including a single dislocation, is suitably masked with a layer 13. If the starting body is silicon the mask may be a relatively thick layer of silicon oxide. A donor impurity is predeposited on the exposed surfaces of the body. Oxide films formed during the predeposition are removed. The body is then placed in a diffusion furnace and diffused for a predetermined period of time whereby the donor impurities diffuse into the body to form an n+ layer as shown in Figure 2B. The layer penetrates deeper at this dislocation as will be presently described in more detail. The upper and side surfaces of the slice are then suitably masked with an acid resistant coating and the slice is subjected to an acid bath whereby the lower oxide layer 13 is removed. Subsequently, the masking material is removed and an oxide layer 14 is formed on the upper surface. The slice is then placed in a predeposition furnace where a layer of acceptor impurities are formed on the surface. The slice is washed and subjected to a diffusion whereby the acceptor impurities diffuse inwardly to form a p+ layer of the type shown in Figure 2D. In Figure 2C, it is seen that the n+ type layer and the p+ type layer extend towards one another along the dislocation and form a high impurity concentration gradient junction 16. The gradient is relatively high in comparison to the gradient at the junction formed between the p+ layer and the adjacent n-type body. In the step illustrated in Figure 2D, the ends of the slice are removed and suitable ohmic contacts 17 and 18 are made to the upper and lower surfaces. Terminal leads 21 and 22 are suitably secured thereto.

It is well known that diffusion proceeds preferentially along dislocations. In the case of arsenic and germanium, results have been reported in an article, entitled "Preferential Diffusion of Antimony Along Small Angle Boundaries in Germanium and the Dependence of This Effect on the Direction of the Dislocation Lines in the Boundary," Journal of Electronics and Control, vol. 3, pages 305–307, September 1957. Similar effects may be expected for other impurities. In general, the strain system around the dislocation vary from compression on one side of the dislocation to expansion on the other. These will cause an impurity to diffuse more quickly along the dislocation line than in the body of the material. The magnitude of this effect will depend upon the particular solvent crystal and the solute impurity involved.

As previously described, the resulting structure has a high impurity concentration gradient p-n junction in the neighborhood of the dislocation. This region will determine the breakdown characteristics of the specimen. Surface breakdown will be minimized since the junction in the outer region of the device are of relatively low concentration gradient. Since only a small region of the structure is a high concentration region, the electrical capacity of the structure will be relatively small. In a junction having substantially uniform avalanche breakdown, the electric field will be high over the entire area as the breakdown voltage is approached. In the instant device, the field will be relatively low in all regions save those in the vicinity of the dislocation.

A structure of the type described will be particularly advantageous for detecting microwave signals of high and varying amplitude. If the structure is biased by a constant current which brings it into the voltage limiting range for the avalanche breakdown along the dislocation, then it will rectify microwave signals since the rectification process in this case is determined by the avalanche effects and thus occurs at very high frequencies.

The device illustrated is particularly resistant to voltage overload because of the series resistance involved in the region around the dislocation and the extremely good thermal conductivity associated with the fact that the region is contained entirely in body of the same material, in the cited example, silicon.

Figure 3A:
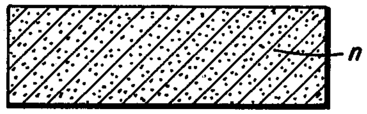
Figure 3B:
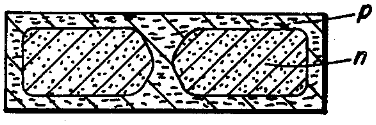
Figures 3C, 3D:
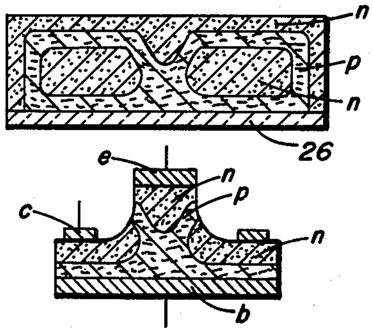

Figures 3A–D illustrate the steps in forming a transistor in accordance with the invention. A p-type impurity is first diffused from both sides of the specimen as illustrated in Figure 3B to form a column in the center of the device along the grain boundary. One surface of the crystal is then protected against diffusion as, for example, by forming a oxide coating 26. The crystal is then subjected to an n-type diffusion to thereby form an n-type layer which extends deeper into the crystal at the dislocation as is shown in Figure 3C. The crystal is then cut as shown in Figure 3D to form separate n, p, and n layers as illustrated. Suitable ohmic contact is formed by metal evaporation or other suitable means. The device has emitter contact *e*, collector *c*, and a base contact *b*. It is seen that the device has extremely small regions and resistivity of the base region is relatively low. The device can then be made to operate at relatively high frequencies.

Figure 4A:
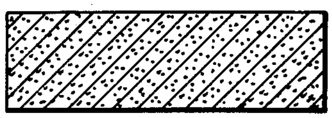
Figure 4B:
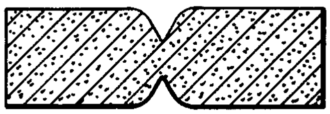
Figure 4C:
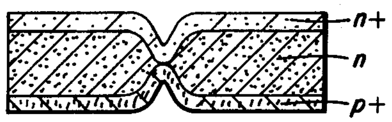

Figures 4A–C show an alternative method of utilizing dislocations to produce structures having localized high impurity concentration gradient junctions. In this case, etch pits are formed along the dislocations from both sides of the crystal so that they extend towards one another to leave a very narrow septum of material between the etch pits on opposite sides, Figure 4B. Subsequently, the crystal is subjected to n and p-type impurity diffusions to form a device of the type shown in Figure 4C. It is observed that a relatively high concentration gradient junction is formed along the dislocation.

The pits formed around a dislocation are advantageous compared to pits which may be formed by other means. A pit formed along a dislocation becomes pointed at the ends, whereas pits formed by electrolytic etching or chemical etching through a mask tend to be rounded at the bottoms. For this reason, a constricted structure of the type shown in Figure 4 formed with etch pits on dislocations will have advantages over constrictions formed by other means since a structure having relatively small dimensions can be formed.

Figure 5:
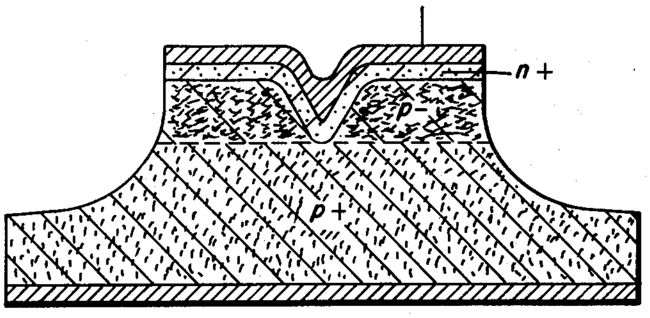
Figure 5 shows another diode formed in accordance with the invention.

Figure 5 illustrates another means of producing localized regions along a crystal dislocation. In this structure the starting material is made so as to have a highly conductive region in the lower portion identified as p+. The upper region is identified as p−. An etch pit is formed along a dislocation on the top surface and diffusion of an n-type impurity over this surface is caused to occur to such a degree that the highly doped material forms a junction with the more heavily doped materials p+, in the base or supporting region. It is seen that a lower concentration gradient junction surrounds the material forming the junction. This structure has the advantage that a relatively large piece of semiconductive material can be used and handled while the working region is maintained extremely small.

Figure 6:
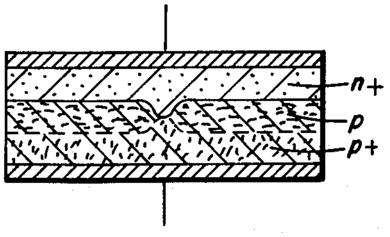
Figure 6 shows a diode similar to that of Figure 1 but containing regions of opposite conductivity types.

Referring to Figure 6, a device similar to that of Figure 2 is illustrated. However, the device illustrated has a body of p-type material rather than n-type material. The device shown in this figure is illustrative of the fact that the process can be carried out with a starting block of either type of material.

Figure 7:
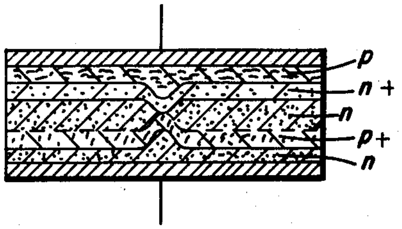
Figure 7 shows a four layer semiconductive device in accordance with the invention.

Figure 7 illustrates a device similar to that shown in Figure 2 which has been subjected to two additional diffusions to form an upper p-type layer and a lower n-type layer. The resulting device is a four layer semiconductive device which has a high concentration gradient center junction. This junction controls the breakdown characteristics of the device.

Thus, it is seen that there is provided a device and method of forming the same in which high impurity concentrations gradient junctions are formed along single dislocations. The junctions are supported by a larger body of material of lower impurity concentration. Devices of this type may be made with extremely small active dimensions.

I claim:

1. A semiconductive device comprising a body of semiconductive material of one conductivity type including at least one dislocation, a diffusion region of opposite conductivity type forming a junction therewith and extending deeper into said body at the dislocation.

2. A semiconductive device comprising a body of semiconductive material of one conductivity type including at least one dislocation, a diffusion region of opposite conductivity type forming a junction therewith and extending deeper into said body at the dislocation, and a second region of said one conductivity type.

3. A semiconductive device comprising a body of semiconductive material of one conductivity type including a single dislocation, a diffusion region of semiconductive material of opposite conductivity type diffused on one surface of said body and extending deeper into the body at said dislocation, and a second diffusion region of said one conductivity type on the opposite surface of said device and diffused deeper into said body at said dislocation and forming a junction with said first region.

4. A semiconductive device comprising a body of semiconductive material of one conductivity type including a single dislocation, a first diffusion region of semiconductive material of opposite conductivity type diffused on one surface of said body and extending deeper into the body at said dislocation, a second diffuser region of said one conductivity type diffused on the other surface of said device and extending deeper into the body at said dislocation and joining the first diffusion region to form a high impurity concentration gradient junction with said first diffusion region.

5. A semiconductive device comprising a body of semiconductive material of one conductivity type including a single dislocation, a diffusion region of semiconductive material of opposite conductivity type diffused on said body and extending along said dislocation, a second diffusion region of said one conductivity type diffused on one surface of said device and extending deeper into said body along said dislocation and forming a junction with said diffusion region of opposite conductivity type.

6. A semiconductive device comprising a body of semiconductive material having a relatively high impurity concentration region and a relatively low impurity concentration region including a single dislocation, a diffusion region of opposite conductivity type formed on said low impurity concentration gradient region and extending deeper into the body along the dislocation to form a high concentration gradient junction with the region of high impurity concentration.

7. A semiconductive device comprising a body of semiconductive material of one conductivity type including a single dislocation, an etch pit formed along said dislocation, a first diffusion region of semiconductive material of opposite conductivity type diffused on said device and extending deeper into said body along said etch pit, and a second diffusion region of the same conductivity type diffused deeper into said body at said dislocation and forming a junction with said first diffusion region.

8. The method of forming a semiconductive device which comprises growing a crystal including dislocations, identifying the dislocations, forming a body of semiconductive material including at least one dislocation, subjecting said body of semiconductive material to first and second diffusions to form relatively high impurity concentration gradient junctions along said dislocation.

9. A semiconductive device comprising a body of semiconductive material of one conductivity type including at least one dislocation and having a relatively high impurity concentration portion and a relatively low impurity concentration portion, an etch pit formed at said dislocation, and a diffusion region of opposite conductivity type formed on said low impurity concentration portion and extending along the etch pit and forming a high concentration gradient junction with the high impurity concentration portion.

10. A semiconductive device comprising a body of semiconductive material of one conductivity type including a single dislocation, a first diffusion region of opposite conductivity type formed on one surface of said body and extending deeper into the body at said dislocation, a second diffusion region of said one conductivity type forming a junction with said first diffusion region, a third region of semiconductive material of said one conductivity type formed on the opposite surface of the body and extending deeper along the dislocation, and a fourth region of semiconductive material of the opposite conductivity type forming a junction with said third region, said first and third regions forming a junction at the dislocation.

References Cited in the file of this patent

Semiconductor Abstracts, volume IV, 1956, page 346, note 1162.